United States Patent
Körschgen et al.

(10) Patent No.: US 9,889,498 B2
(45) Date of Patent: Feb. 13, 2018

(54) MOULD MATERIAL MIXTURE CONTAINING RESOLS AND AMORPHOUS SILICON DIOXIDE, MOULDS AND CORES PRODUCED THEREFROM AND METHOD FOR THE PRODUCTION THEREOF

(71) Applicant: ASK Chemicals GmbH, Hilden (DE)

(72) Inventors: Jörg Körschgen, Leichlingen (DE); Christian Priebe, Wülfrath (DE); Pierre-Henri Vacelet, Saint Marcel (FR)

(73) Assignee: ASK Chemicals GmbH, Hilden (DE)

( * ) Notice: Subject to any disclaimer, the term of this patent is extended or adjusted under 35 U.S.C. 154(b) by 0 days.

(21) Appl. No.: 15/308,398

(22) PCT Filed: Apr. 30, 2015

(86) PCT No.: PCT/DE2015/000207
§ 371 (c)(1),
(2) Date: Nov. 2, 2016

(87) PCT Pub. No.: WO2015/165436
PCT Pub. Date: Nov. 5, 2015

(65) Prior Publication Data
US 2017/0050237 A1 Feb. 23, 2017

(30) Foreign Application Priority Data
May 2, 2014 (DE) .................. 10 2014 106 177

(51) Int. Cl.
*B22C 1/22* (2006.01)
*B22C 9/02* (2006.01)
*B22C 1/10* (2006.01)
*B22C 9/12* (2006.01)
*C04B 35/14* (2006.01)

(52) U.S. Cl.
CPC .............. *B22C 1/2253* (2013.01); *B22C 1/10* (2013.01); *B22C 9/02* (2013.01); *B22C 9/123* (2013.01); *C04B 35/14* (2013.01)

(58) Field of Classification Search
CPC B22C 1/10; B22C 1/2253; B22C 9/02; B22C 9/123; C04B 35/14
See application file for complete search history.

(56) References Cited

U.S. PATENT DOCUMENTS

| 4,426,467 A | 1/1984 | Quist et al. |
| 4,468,359 A | 8/1984 | Lemon et al. |
| 4,474,904 A | 10/1984 | Lemon et al. |
| 4,985,489 A * | 1/1991 | Barker .................. B22C 1/2253 164/16 |
| 5,077,373 A * | 12/1991 | Tsuda ................. C08G 18/0895 521/172 |
| 5,198,478 A * | 3/1993 | Smith .................. B22C 1/2253 523/143 |
| 5,294,648 A * | 3/1994 | Smith .................. B22C 1/2253 523/145 |
| 5,376,696 A * | 12/1994 | Dunnavant ........... B22C 1/2253 523/145 |
| 5,405,881 A * | 4/1995 | Schneider ............. B22C 1/2253 523/145 |
| 5,424,376 A * | 6/1995 | Chang ...................... C08G 8/28 523/145 |
| 6,335,387 B1* | 1/2002 | Twardowska ............. B22C 1/00 164/527 |
| 8,133,933 B2* | 3/2012 | Rediger ................ B22C 1/2253 523/139 |
| 8,365,646 B2 | 2/2013 | Fields |
| 8,367,749 B2* | 2/2013 | Aufderheide ......... B22C 1/2253 228/101 |

FOREIGN PATENT DOCUMENTS

| DE | 280328 A * | 7/1990 |
| DE | 102012020510 A1 | 4/2014 |
| DE | 102012020511 A1 | 4/2014 |
| DE | 102012020509 A1 | 6/2014 |
| EP | 0323096 A2 | 7/1989 |
| EP | 1228128 A1 | 8/2002 |
| JP | 4-292650 A * | 10/1992 |
| WO | WO 2005/107975 A1 * | 11/2005 |

\* cited by examiner

Primary Examiner — Anthony J Green
(74) Attorney, Agent, or Firm — Standley Law Group LLP

(57) ABSTRACT

The invention relates to mold material mixtures for producing molds and cores for metal casting, consisting of at least one refractory material, a binder based on resols and amorphous silicon dioxide. The invention also relates to a multicomponent system and methods for producing molds and cores using the mold material mixtures as well as molds and cores for metal casting produced according to this method.

19 Claims, No Drawings

MOULD MATERIAL MIXTURE CONTAINING RESOLS AND AMORPHOUS SILICON DIOXIDE, MOULDS AND CORES PRODUCED THEREFROM AND METHOD FOR THE PRODUCTION THEREOF

The invention relates to mold material mixtures for producing molds and cores for metal casting, comprising at least a refractory material, a binder based on resols and amorphous silicon dioxide. The invention also relates to a method for producing molds and cores using the mold material mixtures as well as molds and cores for metal casting produced by this method with curing of the mold material mixture.

PRIOR ART

Casting molds essentially consist of molds or molds and cores together which rep-resent the negative form of the casting to be produced. These molds and cores generally consist of a refractory material, for example quartz sand, and a suitable binder that imparts adequate mechanical strength to the casting mold after it is removed from the molding tool. The refractory basic mold material is preferably in free-flowing form, so that after mixing with the binder it can be packed into a suitable hollow mold, compressed and then cured. After curing, the binder ensures firm cohesion between the particles of the basic mold material, so that the casting mold achieves the required mechanical stability.

In casting, molds form the outer walls for the casting; cores are used to form hollow spaces within the castings. It is not absolutely necessary for molds and cores to consist of the same material. For example, in chill casting the outer shaping of the casting is accomplished with the aid of permanent metal molds. In addition, combination of molds and cores produced from mold material mixtures of different com-positions and according to different methods is possible. Although the term "molds" may be used in the following for the sake of simplification, the statements apply equally to cores as well (and vice-versa) that are based on the same mold material mixture and were produced using the same method.

For producing molds, organic, inorganic and mixed organic/inorganic binders (hybrid systems) may be used, the curing of which may be accomplished by cold or hot methods. Cold methods are methods that are essentially performed without heating the molding tools used for producing the cores, generally at room temperature, produced by introducing hot gases or at a temperature induced by an exothermic reaction. For example, the curing is accomplished in that a gas is passed through the mold material mixture being cured, triggering a chemical reaction. In the hot methods, after molding, the mold material mixture is, for example, heated by a heated molding tool to a high temperature to expel the solvent contained in the binder and/or to initiate a chemical reaction that will cure the binder.

The organic polyurethane (PU) cold box process, in which a two-component (2C) binder consisting of a polyol component and a polyisocyanate component is made to react by passing a gaseous or volatile tertiary amine such as dimethylethylamine as a catalyst.

These PU-based binders, however, have the drawback that the amines used as the curing catalysts are toxic and give off a characteristic, highly unpleasant odor. When working with PU-bonded cores, therefore, a highly effective suction system and ex-pensive exhaust purification are required for both mold production and casting.

Therefore alternatives which do not emit pollutants either during core production or during casting are being sought. For this reason in recent years interest in organic/inorganic hybrid systems and pure inorganic binders has increased greatly.

Hybrid systems, i.e., organic binders with considerable inorganic fractions, such as water as the solvent, are disclosed for example in EP 0323096 B2 and in EP 1228128 B1.

These are highly alkaline resol resins that can be cured by treating the mold material mixture with $CO_2$ gas and then act as binders. Essential components of the binders described in the patents named above are oxy anions, e.g., the borate ion (EP 0323096 B2) and the combination of borate and aluminate ion (EP 1228128 B1).

If the strengths of PU cold box binders are compared with those of the $CO_2$-curable resols, it is found that the latter do not achieve the strength level of the PU cold box binders and thus their area of use essentially remains limited to simple, massive cores. To be sure, the problem of emissions during casting is not solved by the use of resol, but in the area of core manufacturing the use of odorless $CO_2$ instead of the tertiary amines, which smell bad and some of which are toxic even at low concentrations, and the at least partial replacement of organic solvent components by water make a better working atmosphere possible.

Therefore there is a need to further develop the $CO_2$-curable resols such that they will reach a higher level of strength. As a result, cores with more complex geometries could be produced or the binder content of massive single cores could be de-creased, which on one hand would increase the economy of the method and on the other hand would reduce the quantity of the emissions occurring during casting.

Thus the goal of the invention is to improve the characteristics of the $CO_2$-curable resol binders, especially to increase their strength.

Composition of the Invention

The above-named tasks are accomplished by the mold material mixture, the multicomponent system or the method as described in the independent claims. Advantageous further developments are subjects of the dependent claims or are described in the following.

Surprisingly it was found that the addition of amorphous silicon dioxide to a mold material mixture comprising at least one refractory basic mold material and $CO_2$-curable resol leads to improved strengths both immediately after molding and curing and after storage of the cured cores at room temperature for 24 hours. In addition, the invention has a positive effect both on the storage life of the molds at high atmospheric humidity and on the strength after heat-treatment of the cores, e.g., after drying the coating (application of an aqueous or alcoholic refractory coating) at 80 to 200° C.

The mold material mixture according to the invention comprises at least the following materials:
a) a refractory basic mold material,
b) an uncured resol as binder or binder component, especially in the form of an aqueous alkaline solution, and further preferably with a pH above 12 and
c) amorphous $SiO_2$ as additive.

The invention also relates to a method for producing a mold or a core comprising the following steps:
a) mixing the binder and the additive with the basic mold material,
b) introducing the mold material mixture obtained in step a) into a molding tool, c) curing the mold material mixture in the molding tool and
d) optionally removing the cured core or the mold from the molding tool.

DETAILED DESCRIPTION OF THE INVENTION

As the refractory basic mold material (also simply called basic mold material in the following) usual and known materials for the production of casting and mixtures thereof may be used. Suitable materials are, for example, quartz, zirconia or chrome sands; olivine, vermiculite, bauxite, fireclay and so-called synthetic basic mold materials, thus basic mold materials brought into spherical or approximately spherical (for example, ellipsoid) form by industrial methods. Examples are synthetic, spherical, ceramic sands—so-called Cerabeads® but also Spherichrome®, SpherOX®, and microspheres such as those that can be isolated as components from fly ash, among others.

Particularly preferred are basic mold materials containing more than 50 wt.-% quartz sand based on the refractory basic mold material. Refractory basic mold materials are defined as substances with a high melting point (melting temperature). The melting point of the refractory basic mold material is advantageously above 600° C., preferably above 900° C., particularly preferably above 1200° C. and especially preferably above 1500° C.

The refractory basic mold material preferably makes up more than 80 wt.-%, especially more than 90 wt.-%, particularly preferably more than 95 wt.-% of the mold material mixture.

The mean diameter of the refractory basic mold materials is generally between 100 μm and 600 μm, preferably between 120 μm and 550 μm and particularly preferably between 150 μm and 500 μm. The particle size can be determined, e.g., by sieving according to DIN ISO 3310. Particularly preferred are particle shapes with good ra-tios of the largest dimension to the smallest dimension (at right angles to one another and for all directions in space) of 1:1 to 1:5 or 1:1 to 1:3, i.e., those that, for example, are not fibrous.

The refractory basic mold material preferably has a free-flowing state, especially to allow processing of the mold material mixture according to the invention in conventional core shooting machines.

As additional components, the mold material mixture according to the invention contains resols in a quantity of 1 to 10 wt.-%, preferably of 1 to 5 wt.-% and particularly preferably of 1 to 4 wt.-%, in each case based on the weight of the basic mold material.

Resols in the sense of the present invention are aromatics bonded over methylene groups (—$CH_2$—) and/or over ether bridges (in particular—$CH_2$—O—$CH_2$—) each having at least one—OH group (hydroxyaromatic). Suitable hydroxyaromatics are phenols, substituted phenols, such as cresols or nonylphenol, 1,2-dihydroxybenzene (pyro-catechol), 1,2-dihydroxybenzene (resorcinol) or 1,4-dihydroxybenzene (hydroqui-none) or phenolic compounds such as bisphenol A, optionally—insofar as non-phenols are also used—preferably in a mixture with phenol.

The resols can be obtained, e.g., by condensation of one or more hydroxyaromatics with one or more aldehydes, in particular in the presence of a basic catalyst, such as ammonium hydroxide or an alkali metal hydroxide. Preferably alkali metal hydroxide catalysts are used.

Suitable aldehydes are formaldehyde, paraformaldehyde, butyraldehyde, glyoxal and mixtures thereof. Particularly preferred is formaldehyde or mixtures containing primarily (based on the molar quantity) formaldehyde.

The molar ratio of aldehyde (optionally as formaldehyde) to phenol in the resol resin can vary within the range of 1:1 to 3:1, but is preferably in the range of 1.6:1 to 2.5:1.

The production of resols is disclosed, e.g., in EP 0323096 B2 and EP 1228128 B1.

Preferred resols are those in which adjacent hydroxyaromatics are bonded at ortho and/or para positions (relative to the hydroxy group of the incorporated phenol/aromatics) over the methylene bridges and/or the ether bridges, i.e., most of the attachments are in "para" and/or "ortho" position.

Additional resol-based binders are described, for example, in U.S. Pat. Nos. 4,426,467, 4,474,904 and 4,468,359. In all three patents the resols are cured with esters, wherein in the first two the curing is performed by addition of a liquid curing agent, e.g., a lactone (U.S. Pat. No. 4,426,467) or of triacetin (U.S. Pat. No. 4,474,904), whereas in U.S. Pat. No. 4,468,359 the mold material mixture is gassed with a volatile ester, e.g., methyl formate, for curing the binder. These binders may also be combined amorphous $SiO_2$, but the strength-increasing effect is not so pronounced as in the $CO_2$-curable resols. Resols that cure with liquid esters do not necessarily require the addition of oxyanion. However, oxyanion are preferably used for curing with $CO_2$.

The resols are used in the form of an aqueous alkaline solution and/or slurry, e.g., with a solids fraction of 30 to 75 wt.-%, in particular the pH is above 12 or even above 13. The viscosity of the aqueous alkaline solution at 25° C. is, e.g., 100 to 800 mPas, in particular 300 to 700 mPas. The viscosity is determined using a Brookfield rotational viscometer (spindle 21 and 50 rpm).

In the scope of this invention, oxygen-containing anions are called oxyanion. Suitable boron-containing oxyanion are in particular borates and/or aluminum-containing oxyanion e.g., aluminates. The boron-containing oxyanion can be used alone or in combination with aluminum-containing oxyanion. The latter is preferred.

The addition of the oxyanion during binder synthesis can take place directly in the form of their salts. The salts preferably contain alkali or alkaline earth metals as the cation, wherein in particular sodium and potassium salts are preferred. However, it is also possible to produce the oxyanion in situ. For example, aluminates form during the dissolution of aluminum compounds such as aluminum hydroxide. A solution of a boron compound such as boric acid in sodium hydroxide is a suitable solution of a boron-containing oxyanion. The alkali can be the solution of a base in water, and is likewise used for mixing with the resol.

The molar ratio of the oxyanion (expressed as B, Al etc.) to hydroxyaromatic group is preferably between 0.1:1 and 1:1 and when exclusively a boron-containing oxyanion is used, is particularly preferably between 0.3:1 and 0.6:1. In the case of a combination of a boron-containing and an aluminum-containing oxyanion, the Al:B atomic ratio is preferably varied within the range of 0.05:1 to 1:1. The particularly preferred range is between 0.1:1 and 0.8:1.

As the base (generally a constituent of the resol, e.g., from the production of the resol) alkali hydroxides such as sodium hydroxide and potassium hydroxide are preferably used. The molar ratio of hydroxide ions to hydroxyaromatic groups (such as phenol) in the binder system is preferably 0.5:1 to 3:1.

In addition to the previously mentioned components, the binder system contains water, preferably in a quantity of 25 to 50 wt.-% based on the weight of the composition. The water serves to dissolve the base and possibly the oxyanion.

In addition, the binder may contain up to 25 wt.-% additives such as alcohols, gly-cols, surfactants and silanes.

The binder is produced in that the resols are mixed with the base, the water and the oxyanion. It is possible first to mix the resol resin with an aqueous solution of the base and then to also mix in the oxyanion(s), e.g., as a solid or in the form of an aqueous solution. It is also possible first to mix the oxyanion with at least part of the base and at least part of the water, and to mix this mixture with the resol resin. Then optionally the remainder of the base, and optionally the remainder of the water as well as the conventional additives are mixed in.

Furthermore, the mold material mixtures according to the invention contain a portion of an amorphous $SiO_2$. In particular, this is particulate amorphous $SiO_2$. Synthetically produced particulate amorphous silicon dioxide is particularly preferred.

The amorphous $SiO_2$ can in particular involve the following types:
a) amorphous $SiO_2$ obtained by precipitation from an alkali silicate solution,
b) amorphous $SiO_2$ obtained by flame hydrolysis of $SiCl_4$,
c) amorphous $SiO_2$ obtained by reduction of quartz sand with coke or anthracite to silicon monoxide followed by oxidation to $SiO_2$,
d) amorphous $SiO_2$ obtained from the process of thermal decomposition of $ZrSiO_4$ to form $ZrO_2$ and $SiO_2$,
e) amorphous $SiO_2$ obtained by oxidation of metallic Si with an oxygen-containing gas, and/or
f) amorphous $SiO_2$ obtained by melting crystalline quartz with subsequent rapid cooling.
c) includes both processes in which the amorphous $SiO_2$ is deliberately produced as the main product and those in which it is obtained as a byproduct, such as in the production of silicon or ferrosilicon.

The amorphous $SiO_2$ used may be either synthetically produced or naturally occurring silicas. The latter are known, for example, from DE 102007045649, but are not preferred, since as a rule these contain appreciable crystalline fractions and are therefore classified as carcinogenic. The term synthetic is applied to non-naturally occurring amorphous $SiO_2$, i.e., its manufacture comprises a deliberately performed chemical reaction, such as that induced by a human being, e.g., the production of silica sols by ion exchange processes from alkali silicate solutions, precipitation from alkali silicate solutions, flame hydrolysis of silicon tetrachloride, and the reduction of quartz sand with coke in an electric arc furnace in the manufacturing of ferrosilicon and silicon. The amorphous $SiO_2$ produced according to the last two methods mentioned is also called pyrogenic $SiO_2$.

Occasionally synthetic amorphous silicon dioxide is defined exclusively as precipitated silica (CAS No. 112926-00-8) and $SiO_2$ produced by flame hydrolysis (Pyrogenic Silica, Fumed Silica, CAS No. 112945-52-5), while the product formed during the manufacturing of ferrosilicon or silicon is merely called amorphous silicon dioxide (Silica Fume, Microsilica, CAS No. 69012-64-12). For the purposes of the present invention, the product formed during the production of ferrosilicon or silicon will also be defined as synthetic amorphous $SiO_2$.

Preferably used are precipitated silicas and pyrogenic silicas, i.e., silicon dioxide produced by flame hydrolysis or in an electric arc. Particular preference is given to the use of amorphous silicon dioxide produced by thermal decomposition of $ZrSiO_4$ (described in DE 102012020509) as well as $SiO_2$ produced by oxidation of metallic Si with an oxygen-containing gas (described in DE 102012020510). Also preferred is powdered quartz glass (mostly amorphous silicon dioxide) produced from crystalline quartz by melting and rapid recooling, so that the particles are present in spherical rather than splintery form (described in DE 102012020511).

The mean primary particle size of the particulate amorphous silicon dioxide can be between 0.05 μm and 10 μm, in particular between 0.1 μm and 5 μm, particularly preferably between 0.1 μm and 2 μm. The primary particle size can, e.g., be determined by dynamic light scattering (e.g., Horiba LA 950) as well as by scanning electron microscopy (SEM photography with, e.g., Nova NanoSEM 230 from the FEI company). Furthermore, the use of SEM photography makes it possible to see details of the primary particle shape down to the order of magnitude of 0.01 μm. For the SEM measurements the silicon dioxide samples were dispersed in distilled water and then placed on an aluminum holder layered with copper tape before the water was evaporated.

In addition, the specific surface of the particulate amorphous silicon dioxide was determined using gas adsorption measurements (BET method) according to DIN 66131. The specific surface of the particulate amorphous $SiO_2$ is between 1 and 200 $m^2/g$, in particular between 1 and 50 $m^2/g$, particularly preferably less than 17 $m^2/g$ or even less than 15 $m^2/g$. Optionally the products may also be mixed, e.g., to sys-tematically obtain mixtures with certain particle size distributions.

The particulate amorphous $SiO_2$ can contain different amounts of byproducts. For example, the following may be mentioned in this regard:
  carbon in the case of reduction of quartz sand with coke or anthracite,
  iron oxide and/or Si in the case of production of silicon or ferrosilicon, and/or
  $ZrO_2$ in the case of thermal degradation of $ZrSiO_4$ to form $ZrO_2$ and $SiO_2$.
  Additional byproducts may be, e.g., $Al_2O_3$, $P_2O_5$, $HfO_2$, $TiO_2$, CaO, $Na_2O$ and $K_2O$.

It is preferred that the amorphous $SiO_2$ used for the invention have a $SiO_2$ content of at least 70 wt.-%, preferably at least 80% and especially preferably at least 90 wt.-%.

The quantity of amorphous $SiO_2$ added to the mold material mixture according to the invention is usually between 0.05 wt.-% and 3 wt.-%, preferably between 0.1 wt.-% and 2.5 wt.-% and particularly preferably between 0.1 wt.-% and 2 wt.-%, in each case based on the basic mold material.

The addition of the amorphous $SiO_2$ to the basic mold material can take place in the form of an aqueous paste, as a slurry in water or as a dry powder. The latter is preferred.

The amorphous $SiO_2$ is preferably present in particulate form. The particle size of the particulate amorphous silicon dioxide is advantageously less than 300 μm, preferably less than 200 μm and especially preferably less than 100 μm and has, e.g., a mean primary particle size between 0.05 μm and 10 μm. The sieve residue of the particulate amorphous $SiO_2$ in the case of passage through a sieve with a mesh size of 125 μm (120 mesh) advantageously amounts to no more than 10 wt.-%, particularly preferably no more than 5 wt.-% and most particularly preferably no more than 2 wt.-%. Independently of this, the sieve residue on a sieve with a mesh size of 63 μm amounts to less than 10 wt.-%, advantageously less than 8 wt.-%. The sieve residue is determined by the machine sieving method described in DIN 66165 (Part 2), in addition a chain ring is used as a sieving aid.

The particulate amorphous silicon dioxide advantageously used according to the present invention has a water content of less than 15 wt.-%, in particular less than 5 wt.-% and particularly preferably of less than 1 wt.-%.

The particulate amorphous $SiO_2$ is advantageously used in the form of a powder (including dusts).

The order of addition of resol resins, binder and amorphous $SiO_2$ to the basic mold material is not of decisive importance. It can take place either before or after or together with the binder. Preferably, however, first the amorphous $SiO_2$ is added and then the binder. In any case, however, the binder must not be already cured before the amorphous $SiO_2$ is added to the basic mold material.

The mold material mixture can additionally if desired contain other additives such as iron oxide(s), ground wood fibers or mineral additives.

The invention will be explained in further details based on the examples that follow, without being limited to these.

EXAMPLES

1. Preparation of the Mold Material Mixtures
1.1 Without Addition of Amorphous $SiO_2$ Quartz sand was filled into the bowl of a Hobart mixer (Model HSM 10). Then under agitation the binder was added and mixed intensively with the sand for 1 min. The sand used, the type of binder and the respective quantities added are shown in Tab. 1. The quantities are given in parts by weight (PBW).

1.2. With Addition of Amorphous $SiO_2$

The method as given under 1.1 was followed, with the difference that first particulate amorphous $SiO_2$ was mixed in for 1 min and then the binder addition took place. The types of amorphous $SiO_2$ used and the quantities added are presented in Tab. 1.

TABLE 1

|  | Quartz sand H 32[a] [PBW] | Binder [b] [PBW] | Amorphous $SiO_2$ [PBW] |  |
|---|---|---|---|---|
| 1.1 | 100 | 2.5 |  | not according to invention |
| 1.2 | 100 | 2.5 | 0.5[c] | according to invention |
| 1.3 | 100 | 2.5 | 1[c] | according to invention |
| 1.4 | 100 | 2.5 | 0.5[d] | according to invention |
| 1.5 | 100 | 2.5 | 1[d] | according to invention |

[a] Quarzwerke Frechen GmbH
[b] Novanol 240 (ASK Chemicals GmbH)
[c] Microsilica 971 U (Elkem AS; manufacturing: Production of silicon/ferrosilicon
[d] Microsilica POS B-W 90 LD (Possehl Erzkontor GmbH, manufacturing process: production of $ZrO_2$ and $SiO_2$ from $ZrSiO_4$ 2. Preparation of the Test Pieces Part of a mold material mixture produced according to 1.1 and 1.2 was transferred to the storage chamber of a H 1 core shooting machine from Röper Gießereimaschinen GmbH, Viersen. The remainder of the mold material mixture was stored in a carefully closed vessel to protect it from drying before use for refilling the core shooting machine.

From the storage chamber of the core shooting machine, the mold material mixtures were delivered using compressed air (4 bar) into a molding tool provided with 2 engraved parts for producing rectangular box-shaped test pieces with dimensions of 150×22.36×22.36 mm (so-called Georg Fischer bar). For curing, 1 litre of $CO_2$ was passed through the molding tool for 30 seconds.

Then the test pieces were removed from the tool and their strengths determined after preset times. The storage of the test pieces for strength determination was conducted in the laboratory at 23° C. and 50% rel. humidity or in a climate chamber from the Rubarth company at 23° C. and 98% rel. humidity.

3. Heating the Test Pieces

In each case 2 of the test pieces stored at 23° C./50% rel. humidity per mold material mixture, at 10 min. after their production. were held in a circulating air oven for 30 min at 150° C. After removal from the oven and cooling to room temperature (1 h) the strengths were determined.

4. Coating the Test Pieces
4.1. Water Coating (Refractory Mold Material Coating)

In each case 4 test pieces per mold material mixture stored at 23° C./50% rel. humidity, 10 min. after their production, were dipped for 3 sec. in the water coating, Miratec DC 3 (commercial product of ASK Chemicals GmbH) and placed on a rack in the laboratory to dry. After holding for 30 min., the strengths of 2 test pieces were determined. The other two test pieces were held in a circulating air oven at 150° C. for 30 min. for complete drying of the coating. After removal from the oven and cooling to room temperature (1 hr.) the strengths were determined.

4.2. Alcohol Coating (Refractory Mold Coating)

In each case 4 test pieces per mold material mixture, stored at 23° C./50% rel. humidity, 10 min. after their manufacturing were dipped for 3 sec. in the alcohol coating Velvacoat GH 701 (commercial product of ASK Chemicals GmbH) and placed on a rack to dry at 23° C./50% rel. humidity. The strengths of 2 test pieces each were determined after holding for 30 min. and 24 hr.

5. Strength Testing

The bending strengths were determined as a measure of the strengths of the test pieces. For this purpose the test pieces were placed in a Georg Fischer strength testing device, equipped with a 3-point bending device, and the force (in $N/cm^2$) required for breaking the test pieces was measured.

The results are shown in Tab. 2.

TABLE 2

|  | not according to invention 1.1 | according to invention 1.2 | according to invention 1.3 | according to invention 1.4 | according to invention 1.5 |
|---|---|---|---|---|---|
| no coating, room temp. |  |  |  |  |  |
| 30 sec. | 70/70 | 80/80 | 80/90 | 80/90 | 90/90 |
| 0.5 h. | 120/120 | 130/130 | 140/140 | 110/120 | 160/170 |
| 1 h. | 110/120 | 130/150 | 140/150 | 160/180 | 170/180 |
| 2 h. | 130/130 | 140/160 | 160/170 | 170/180 | 190/200 |
| 24 h. | 160/170 | 170/180 | 180/200 | 190/200 | 220/240 |
| 24 h./98% rel. humidity | 100/110 | 110/120 | 140/140 | 110/130 | 150/150 |
| no coating, 30 min. 150° | 190/200 | 200/220 | 220/240 | 220/220 | 280/290 |

TABLE 2-continued

|  | not according to invention 1.1 | according to invention 1.2 | according to invention 1.3 | according to invention 1.4 | according to invention 1.5 |
|---|---|---|---|---|---|
| water coating |  |  |  |  |  |
| 30 min. wet | 100/100 | 120/120 | 130/140 | 120/130 | 150/160 |
| 30 min. wet/30 min. 150° alcohol coating | 150/150 | 190/200 | 210/220 | 200/210 | 250/270 |
| 30 min. air drying | 100/110 | 100/120 | 130/130 | 120/120 | 140/140 |
| 24 hr. air drying | 150/160 | 160/170 | 170/190 | 180/190 | 190/200 |

Results:

It is apparent from Tab. 2 that the addition of amorphous $SiO_2$ to the mold material mixtures has advantageous effects on the bending strengths of the test pieces. The effect of the amorphous $SiO_2$ obtained by thermal decomposition of $ZrSiO_4$ to $ZrO_2$ and $SiO_2$ (Ex. 1.4 and 1.5) is greater in these tests than that of the $SiO_2$ obtained from the production of silicon/ferrosilicon (Ex. 1.2 and 1.3).

The invention claimed is:

1. A mold material mixture for producing molds or cores comprising:
    a refractory mold material, such that more than 80% by weight of the mold material mixture comprises the refractory mold material,
    alkaline resols and water as a binder or as a binder component, such that the alkaline resols amount to 1 to 10% by weight of the weight of the refractory mold material; and
    amorphous $SiO_2$ as additive, wherein the amorphous $SiO_2$ is a particulate having a mean particle diameter between 0.05 μm and 10 μm, as determined by dynamic light scattering and is present in the range of 0.1 to 2% by weight of the weight of the refractory mold material.

2. The mold material mixture according to claim 1, wherein the mold material mixture is obtained by bringing together:
    component (A), having amorphous $SiO_2$ in powder form, with no water and no resol,
    component (B), a binder component comprising the alkaline resol, water and no amorphous $SiO_2$ and
    component (F), a free-flowing refractory comprising the refractory mold material and no resol.

3. The mold material mixture according to claim 1, wherein the refractory mold material comprises quartz sand, zirconia sand, chrome sand; olivine, vermiculite, bauxite, fireclay, glass beads, granular glass, aluminum silicate microspheres and mixtures thereof.

4. The mold material mixture according to claim 1, wherein the refractory mold material has mean particle diameters of 100 μm to 600 μm, determined by sieve analysis.

5. The mold material mixture according to claim 1, wherein the amorphous silicon dioxide has a surface area determined by BET of between 1 and 200 $m^2/g$.

6. The mold material mixture according to claim 1, wherein the amorphous silicon dioxide is selected from the group consisting of: precipitated silica, pyrogenic silicon dioxide produced by flame hydrolysis or in an electric arc, amorphous silicon dioxide produced by thermal decomposition of $ZrSiO_4$, silicon dioxide produced by oxidation of metallic silicon with an oxygen-containing gas, quartz glass powder with spherical particles produced from crystalline quartz by melting and rapid recooling, and mixtures thereof.

7. The mold material mixture according to claim 1, wherein the mold material mixture contains the amorphous silicon dioxide in quantities of 0.1 to 2 wt.-%, based on the refractory mold material.

8. The mold material mixture according to claim 1, wherein the amorphous silicon dioxide has a water content of less than 5 wt.-%.

9. The mold material mixture according to claim 1, wherein the resols are $CO_2$-curable.

10. The mold material mixture according to claim 1, wherein the mold material mixture contains oxyanions.

11. The mold material mixture according to claim 10, wherein the oxyanions contain at least one of boron and aluminum, and, when both are present, the Al:B atomic ratio is 0.05:1 to 1:1.

12. The mold material mixture according to claim 1, wherein the mold material mixture contains 10 to 40 wt.-% caustic materials.

13. The mold material mixture according to claim 1, wherein the resols are added in the form of an aqueous alkaline solution.

14. The mold material mixture according to claim 2, wherein a curing agent is added to the mold material mixture as a constituent of component (B) or as an additional component.

15. The mold material mixture according to claim 10, wherein the oxyanions are part of the binder or the binder component.

16. A method for producing molds or cores comprising:
    providing a mold material mixture according to claim 1 by bringing together and mixing the following components:
        component (A), having amorphous $SiO_2$ in powder form, with no water and no resol,
        component (B), a binder component comprising an alkaline resol, water and no amorphous $SiO_2$ and
        component (F), a free-flowing refractory comprising a refractory mold material and no resol;
    introducing the mold material mixture into a mold, and curing the mold material mixture by introducing carbon dioxide into the mold.

17. The method according to claim 16, wherein the mold material mixture, for curing, is exposed to a temperature of 5 to 60° C.

18. A multicomponent system for producing molds or cores comprising:
    component (A), having amorphous $SiO_2$ in powder form, no water and no resol,
    component (B), a binder component comprising the alkaline resol, water and no amorphous $SiO_2$ and component (F), a free-flowing refractory component comprising the refractory mold material and no resol.

19. A method for producing molds or cores comprising the steps of:
providing a mold material mixture by bringing together and mixing the following components:
component (A), having amorphous $SiO_2$ in powder form, with no water and no resol,
component (B), a binder component comprising an alkaline resol, water and no amorphous $SiO_2$ and
component (F), a free-flowing refractory comprising a refractory mold material and no resol,
introducing the mold material mixture into a mold, and curing the mold mixture in the mold by either:
adding at least one ester, liquid at room temperature, as a curing agent when mixing the components; or
introducing at least one gaseous ester into the mold.

* * * * *